Sept. 11, 1934.  G. L. MILLER ET AL  1,973,217
CLUTCH DEVICE FOR MOTOR ACCELERATING MEANS
Filed July 6, 1929   2 Sheets-Sheet 1
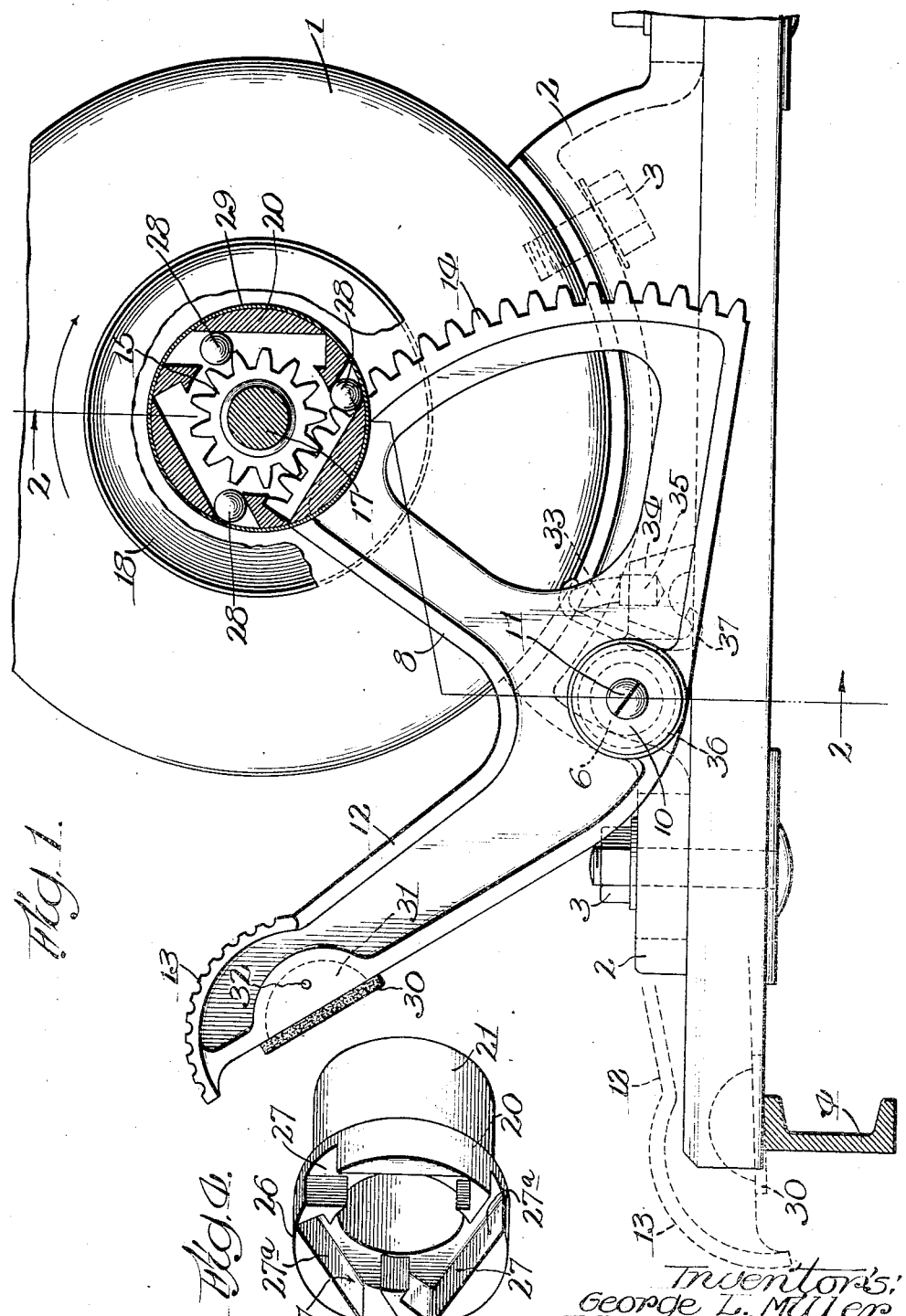
Inventors:
George L. Miller
John Mikulasek
By Wallace R. Lane Atty.

Sept. 11, 1934. G. L. MILLER ET AL 1,973,217
CLUTCH DEVICE FOR MOTOR ACCELERATING MEANS
Filed July 6, 1929 2 Sheets-Sheet 2
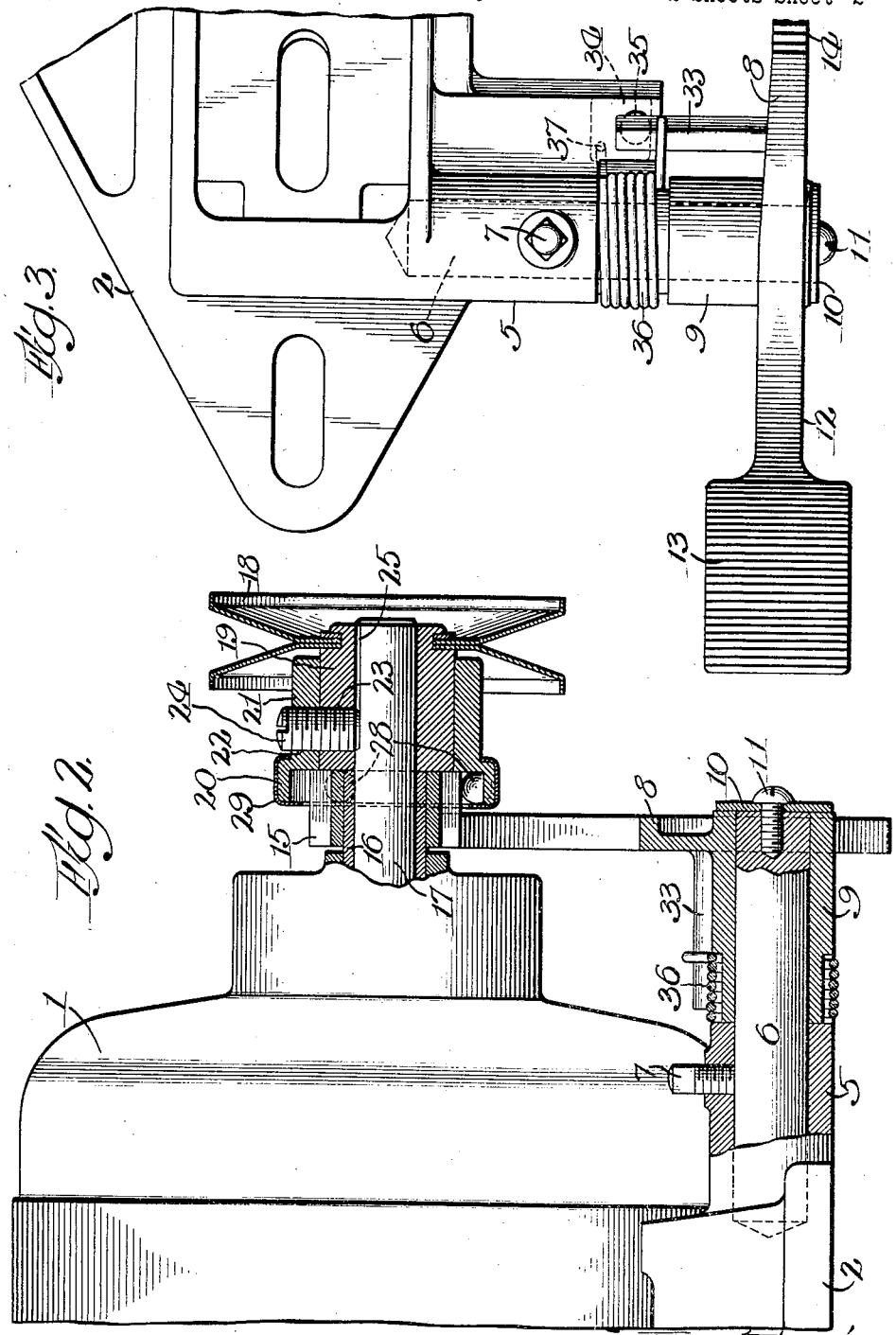

Patented Sept. 11, 1934

1,973,217

UNITED STATES PATENT OFFICE 1,973,217

CLUTCH DEVICE FOR MOTOR ACCELERATING MEANS

George L. Miller and John Mikulasek, Newton, Iowa, assignors to The Maytag Company, Newton, Iowa, a corporation of Delaware Application July 6, 1929, Serial No. 376,319

3 Claims. (Cl. 192—45)

The invention relates to accelerating devices for electrical motors or the like.

Among the objects of the invention are to provide a novel clutch to be used with a device for manually accelerating the rotor or armature in an electrical motor or the like.

The invention comprehends the idea of providing novel means for manually turning over the rotor or armature of an electrical motor or the like, and to accelerate the same, when to electrically accelerate the rotor or armature, would cause undue strains and stresses upon the electrical windings and operating mechanisms of the motor. This is particularly true where a motor is directly connected to operating mechanism where the gears and the like have become frozen, due to the congealing of the grease and oil in which they are packed for lubrication purposes. The providing of manually operable accelerating means dispenses with the necessity of depending upon electrical means for producing such acceleration which might under such conditions produce excessive heating of the motor windings and cause the same to be burned out or damaged.

It is a further object of the invention to provide a novel device for manually accelerating a motor to a speed sufficient so that when the motor is thrown into an electrical circuit for operating the motor at its normal operating speed, the initial electrical power torque in the motor will be commensurate with the speed manually attained, as a result of which the rotor or armature windings and stator windings of the motor are not injured.

It is still a further object of the invention to provide manually operable means for sufficiently accelerating the rotor or armature of the motor to such a speed as to cause the automatic means with which the motor may be equipped to operate and throw the motor into an electrical circuit for maintaining the normal operating speed of the motor. A motor with which the novel device may be used may be the split phase type motor. Such a motor may be provided with a stator having two windings, one of which is designated as the starting winding and the other as the running or working winding. The automatic means referred to is so designed as to throw the motor into an electrical circuit for normally operating the motor when the rotor or armature has reached a predetermined speed. The starting winding is then disconnected at that time, and the motor operates in connection with the electrical running circuit. Often times, because of low temperatures and because of the congealing of the lubricants in the mechanism directly connected to such a motor or due to too great a load or torque, the electrical starting circuit is insufficient to accelerate the rotor sufficiently to throw the automatic means into the normal electrical operating circuit.

Again, the overloading of the motor in starting it and accelerating it, often times causes fluctuations in the electrical circuit and the burning out of the fuses.

It is therefore, an object of the invention to overcome these difficulties and manually accelerate the motor to a speed sufficient to operate the automatic means and to throw the motor into the normal electrical operating circuit.

It is further an object of this invention to provide a clutch for a motor accelerating means that is simple in operation and construction, and contains a minimum of parts, but which is adapted to turn the motor shaft when the manual means is operated in one direction and which will become disengaged from said shaft when said means is being returned to its original position or when the motor shaft has attained sufficient speed so that the action of centrifugal force will cause such disengagement. Another object is to provide a clutch mechanism having one pinion, the same being used to engage both the manual means and the motor shaft, and thus further reduce the parts necessary to start the motor.

The invention also comprehends other objects, advantages, capabilities and features as will later appear and are inherently possessed thereby.

Referring to the drawings:

Fig. 1 is a view in side elevation of an embodiment constructed in accordance with the invention with parts broken away to show in cross-section the arrangement of elements mounted upon the motor shaft.

Fig. 2 is a cross sectional view of the embodiment of the invention taken in the planes represented by the lines 2—2 in Fig. 1 of the drawings.

Fig. 3 is a fragmentary top plan view of the embodiment selected to illustrate the invention and showing the manually operable means of the device.

Fig. 4 is a detached view in perspective of a ratchet-wheel as used in the embodiment selected to disclose the invention.

Referring now more in particular to the drawings, the embodiment selected to illustrate the invention is shown in connection with a motor 1 connected to a motor base 2 by any suitable means such as bolts 3, the base resting or mounted upon frame work, of which a channel-iron 4 is a part.

The motor base 2 is provided with a hollow lug or extending portion 5 adapted to receive the stud pin 6 which is held securely in the hollow lug 5 by a set screw 7, and upon which is rotatably mounted a segmental member 8 having a hub portion 9. A plate 10, connected to the stud pin 6 by a screw 11 or other suitable means is provided, which overlaps the end walls of the hub 9 and holds the same in operative position with the pin 6.

The segmental member 8 is provided with an extending lever arm 12 having a corrugated pedal portion 13 at its end. The segmental member 8 is also provided at its periphery with gear teeth 14 adapted to mesh with the teeth of a pinion gear 15 which is rotatably mounted upon a bushing 16 which in turn is mounted upon the extending shaft 17 carrying the rotor or armature (not shown) of the motor 1. A sheave pulley 18 having a hub portion 19 is provided and is mounted on the end of the shaft 17 for driving, by means of a belt (not shown), mechanisms with which the belt is connected.

A ratchet wheel 20 having a hub 21 is provided and is adapted to be mounted upon the hub 19 of the pulley 18. The ratchet wheel 20 is provided with a threaded hole 22 which is adapted to register with a similar hole 23 on the hub 19 of the pulley 18 when the hub 21 is slipped over the hub 19, the ratchet wheel 20 and pulley 18 being held in operative position upon the shaft 17 by means of a set screw 24 in threaded engagement with the holes 22 and 23 respectively and whose end abuts the flat milled portion 25 of the shaft 17.

The ratchet wheel 20 is provided with an enlarged end 26 having slots 27 cut or milled into the face thereof to provide guiding passages for the balls 28. The enlarged end 26 of the wheel 20 is adapted, when the wheel is in position on the shaft 17, to overhang the pinion gear 15 and the side walls 27ᵃ of the slots 27 are milled to a sufficient distance away from the teeth in the pinion gear so that when the balls 28 are in the position as shown in Fig. 1 of the drawings, one of the balls will fall by force of gravity and wedge between two of such teeth and the wall 27ᵃ so that rotation of the pinion gear 15 causes a like rotation of the ratchet wheel 20 which in turn causes rotation of the shaft 17 and motor. A thin sheet metal mantle 29 or the like is provided for surrounding the enlarged end 26, closing one end of the milled slots 27 to confine the movement of the balls 28 within the slots 27.

When pressure is exerted upon the pedal end 13 of the pivoted segmental member 8, the teeth 14 traveling in an arcuate path and meshing with the teeth on the pinion gear 15 cause a rotation of this pinion gear 15, which when rotated, causes certain of the balls 28 to become wedged between the teeth of the pinion gear and the walled portion 27ᵃ of one of the slots 27 to rotate the ratchet wheel 20 and likewise shaft 17 of the motor and motor mechanism attached thereto. The balls not in wedged engagement with the pinion gear 15 assume a position in the slots 27 adjacent to the mantle 29 until such time as their respective slots are in such a position to cause them to drop by gravity into the teeth of the pinion gear 15.

The movement of the segmental member 8 is limited in a counter-clockwise direction by the lever or arm 12 striking the channel iron 4, the impact being silenced by the provision of a rubber plug 30 which is held in the recessed portion 31 in the lever or arm 12 by any suitable means such as a pin 32 passing through the sidewalls of the recessed portion 31 and plug 30. In order to limit the movement of the segmental member 8 in a clockwise direction, the member 8 is provided with an extending lug 33 which strikes the lug 34 which is provided with a rubber plug 35 seating in an opening therein.

A coiled spring 36 mounted on the hub 9 of the segmental member 8 and having an end 37 hooked under the lug 34 on the motor base 2 and the other end hooked over the extending lug 33 of the member 8 is provided to cause the segmental member 8 to assume its normal operative position as shown in Fig. 1 of the drawings after an operator has stepped on the foot pedal 13 to produce movement of the pinion gear 15.

It will be seen that when pressure is applied at the end portion 13 that the segmental member 8 rotates in a counter-clockwise direction to cause a rotation of the pinion gear 15 and likewise the motor. An operator may then release the foot pedal 13 when the segmental member reassumes its position as shown in Fig. 1 of the drawings. A further reapplication of pressure on the foot pedal causes further rotation of the pinion and likewise further rotation of the motor.

A swift application of pressure to the foot pedal 13 causes rotation of the pinion 15 and ratchet wheel 20 by which sufficient speed of the motor is attained to permit the throwing in of the same into an electrical circuit for maintaining such speed or acceleration.

When a certain desired speed is attained, the segmental member is allowed to remain at rest as in Fig. 1 of the drawings, and it will be seen that in such a position that the pinion gear 15 rides upon the shaft 17 and in mesh with the teeth 14 of the segmental member 8. At such time, the speed of the ratchet wheel is such that the centrifugal force throws the balls 28 out of wedged engagement with the gear 15 and into the end portions of the slots 27 adjacent to the mantle 29.

With such a device, as shown and described herein, connected to a motor, it is unnecessary to throw the motor into an electrical starting circuit which as previously indicated, is very detrimental to the motor and its operating mechanisms, especially when the lubricants have become congealed. It further obviates the difficulties experienced with the fuses provided in the electrical circuits, inasmuch as the fluctuations or surging and resurging of the electrical energies are not present. The length of life of the motor is increased, and the replacements necessary for maintaining the motor and motor mechanisms in order to keep the same in working condition are appreciably decreased.

While we have herein described and upon the drawings illustrated an embodiment of the invention, it is to be understood that the latter is not limited thereto, but comprehends other details, arrangements of parts, features and constructions, without departing from the spirit thereof.

Having thus disclosed the invention, we claim:
1. A clutch device for a motor accelerating means, comprising a shaft, a pinion rotatable thereon, a ratchet wheel mounted on said shaft, said wheel having one end overlapping said pinion, a mantle enclosing said wheel, said end of said wheel having tangential grooves therein, and balls in said grooves adapted to engage said pinion with said wheel when said pinion is rotated in one direction and adapted to disengage said pinion upon a reverse movement thereof or by the action of centrifugal force upon the shaft attaining sufficient speed in the first mentioned direction.

2. A clutch device for a motor accelerating means comprising a shaft, a pinion rotatable thereon, a ratchet member mounted on said shaft in such manner as to rotate therewith, said ratchet member having an end portion overlapping and encircling said pinion, said overlapping end portion having tangentially arranged slots therein, clutch members movably mounted in the slots, and means for rotating said pinion, said slots being so spaced with respect to the teeth of the pinion that one of said movable clutch members will fall by gravity into engagement with said pinion in such manner that the pinion and the ratchet member will be in clutched engagement during rotation of the pinion in one direction and in declutched relation during rotation of the pinion in the reverse direction and after the shaft and ratchet member attain a predetermined speed in the first direction.

3. A clutch device for a motor accelerating means comprising a shaft, a pinion rotatable thereon, a ratchet member mounted on said shaft in such manner as to rotate therewith, said ratchet member having an end portion overlapping and encircling said pinion, said overlapping portion having tangentially arranged slots therein provided with extensions terminating adjacent the periphery of the overlapping portion, clutch members movable within said slots, and means for rotating said pinion, said slots and the extensions thereof being so spaced with respect to the teeth of the pinion that one of the movable clutch members will fall by gravity out of the extension of its slot and into engagement with the pinion in such manner that the pinion and the ratchet member will be in clutched engagement during rotation of the pinion in one direction and in declutched relation during rotation of the pinion in the reverse direction and after the shaft and ratchet member attain a predetermined speed in the first direction.

GEORGE L. MILLER.
JOHN MIKULASEK.